(12) United States Patent
Just

(10) Patent No.: US 7,171,672 B2
(45) Date of Patent: Jan. 30, 2007

(54) DISTRIBUTED APPLICATION PROXY GENERATOR

(75) Inventor: Adam Just, San Diego, CA (US)

(73) Assignee: Telefonaktie Bolaget LM Ericsson (publ) (SE)

( * ) Notice: Subject to any disclaimer, the term of this patent is extended or adjusted under 35 U.S.C. 154(b) by 589 days.

(21) Appl. No.: 10/131,527

(22) Filed: Apr. 24, 2002

(65) Prior Publication Data
US 2003/0208640 A1 Nov. 6, 2003

(51) Int. Cl.
G06F 13/00 (2006.01)
(52) U.S. Cl. ......................... 719/330; 719/328; 714/52
(58) Field of Classification Search ............... 719/330, 719/331, 332, 310, 328; 709/203, 208, 217; 714/37, 38, 48, 49, 52, 100, 759, 798, 799
See application file for complete search history.

(56) References Cited

U.S. PATENT DOCUMENTS

| | | | |
|---|---|---|---|
| 6,230,160 B1 * | 5/2001 | Chan et al. ............. 707/103 X |
| 6,324,619 B1 | 11/2001 | Raverdy et al. |
| 6,385,661 B1 * | 5/2002 | Guthrie et al. ............ 719/316 |
| 6,567,861 B1 * | 5/2003 | Kasichainula et al. ...... 719/330 |
| 6,622,175 B1 * | 9/2003 | Piller ..................... 719/313 |
| 6,629,128 B1 * | 9/2003 | Glass ..................... 709/203 |
| 6,751,631 B2 * | 6/2004 | Hrebejk et al. ......... 707/103 R |
| 6,877,163 B1 * | 4/2005 | Jones et al. .............. 719/332 |
| 6,951,021 B1 * | 9/2005 | Bodwell et al. ........... 719/316 |

2003/0167358 A1 * 9/2003 Marvin et al. ............. 709/328

OTHER PUBLICATIONS

Gopalan Suresh Rai: The Corba Component Model (CCM); 6 pgs.
Niska, et al.; Java in Distributed Computing: 7 pgs.
CS 696 Emerging Technologies: Java Distributed Computing; Spring Semester, 1999; 11 pgs.
Java IDL; The "Hello World" Example: 9 pgs.
Exceptions: 5 pgs.
Naming Service: 5 pgs.
Using CORBA and Java IDL: 5 pgs.
COBRA FAQ; Object Management Group: 23 pgs.

* cited by examiner

Primary Examiner—William Thomson
Assistant Examiner—Andy Ho
(74) Attorney, Agent, or Firm—Coats & Bennett, P.L.L.C.

(57) ABSTRACT

A proxy generator produces computer code for compilation as a client-side proxy in support of client-server distributed software applications. Using information from a software "contract" file that defines the desired functionality of the distributed application, and, optionally, from a configuration file that tailors proxy operation for a specific application, the proxy generator generates proxy code for compilation as a generated proxy. This generated proxy interfaces a client application with a server application, and insulates the client application from the complexities of distributed computing. More particularly, the generated proxy automatically includes exception-handling mechanisms tailored to the software contract for both recoverable and non-recoverable errors. Information in the configuration file determines the generated proxy's response to recoverable errors, such as the number of retries attempted for a given type of network communication error.

20 Claims, 9 Drawing Sheets

DISTRIBUTED APPLICATION PROXY GENERATOR

BACKGROUND OF THE INVENTION

The present invention generally relates to distributed software applications involving a client and a server, and particularly relates to automatic proxy generation for distributed applications.

Software applications generally split into broad categories defined by their implementation details. For example, two broad application categories are stand-alone applications and client-server applications, oftentimes referred to as "distributed" applications. As might be guessed, stand-alone applications operate in a self-contained environment on a host computer. In contrast, distributed applications use two or more computer systems cooperatively linked together by a network or other communication link.

For a distributed application, one or more systems generally assume the role of "server," and provide service to one or more distributed clients. With this approach, the server may operate as a data store, and often serves as a computing platform available for use by the client applications. That is, a client application commonly invokes a server object method remotely, which executes on the server and returns results to the client application.

Such operations offer advantages in terms of enabling remote users to leverage the computing and storage resources of a potentially powerful server or servers, but also include the attendant disadvantages of increased software complexity. For example, distributed applications must deal with a host of potential errors and problems that stand-alone applications avoid. Such problems include network failures or other communication errors that degrade or prevent communication between a given client application and the server application. Further, data processing errors or problems might be incurred at one or both the client and the server, and the distributed application (the combined client-server applications) should provide robust error handling for such scenarios.

Distributed application errors that are ignored or poorly handled often result in unreliable and inconsistent software operation, which can stifle ongoing development of the software and frustrate end users. Handling errors at least at a high level may provide some added measure of reliability, but can deprive developers and users access to meaningful, lower-level information about the underlying error, or root cause of the error. Thus, for error handling to be truly robust, it must be expansive enough to deal with a broad range of error types, and yet include enough detailed error handling to support meaningful communication of error information.

In short, programmers generally face significant challenges when developing robust distributed applications. One approach to meeting such challenges includes the use of proxies on the client side and/or server side. A client-side proxy resides between the client-side application and the server-side application and acts, in some respects, as a mediator or go-between for the two applications. Through use of a proxy, the client application can be shielded, at least to some extent, from the vagaries of distributed application processing. That is, the proxy may be made to handle some or all of the overhead and potential error processing and recovery associated with interacting with the server application via the network.

One disadvantage of proxies stems from the additional labor required in writing the code to support proxy generation. While at least some of the general types of proxy-based capabilities are common across a broad range of distributed application types, each proxy necessarily includes information specific to a given application. Consequently, a traditional approach to proxy generation involves the programmer manually writing the software instructions describing proxy operation based on details of the distributed application and the network environment at hand.

BRIEF SUMMARY OF THE INVENTION

The present invention provides a method and apparatus for simplifying the generation of distributed software applications by using a proxy generator to automatically generate a client-side proxy that provides, among other things, a client interface consistent with defined software requirements, distributed computing support, and robust, configurable error handling. Use of a modifiable configuration file by the proxy generator tailors proxy generation to the needs of a particular application, and for a particular network environment.

The proxy generator "reads" a distributed application contract and generates an interface class proxy that offers the client application an application program interface or API that conforms to the specified contract yet shields the client application from the details of distributed computing, e.g., network communications, remote invocations, etc. Further, the proxy generator derives exception classes from built-in base exception classes, wherein the derived exception classes include as members the various explicit or user exceptions defined in the software contract. These derived classes are dynamically constructed such that they include methods for obtaining detailed error information consistent with the exceptions as defined in the original contract, and for making such information available to the client application through a uniform "exception class" interface.

Additionally, the proxy generator can offer the distributed application developer significant flexibility in terms of tailoring the generated proxy for the needs of a particular distributed application project. For example, the proxy generator provides for modifiable implicit error handling through use of a configuration file. In this context, implicit errors refer to those errors involving system/network operation rather than data entry type errors or other such explicit errors. For example, network communication failures and transient resource unavailability, e.g., server overload, represent common types of implicit errors.

With the configuration file, the application developer is offered the opportunity to specify the desired behavior of the generated proxy as regards any number of such implicit errors. For example, if the generated proxy encounters a network communication failure during execution, the number of times it re-tries a failed communication can be configured based on the value of one or more constants appearing in the configuration file. Thus, the generated proxy can retry for errors where it makes sense for one or more follow-up attempts, or handle/pass-on the encountered error where retries are not likely to solve the problem. In any case, use of the configuration file allows the developer to tailor the desired error handling behavior of the generated proxy, and offers additionally flexibility, such as the opportunity to provide server implementation location information to the proxy generator.

Proxy generation in accordance with the present invention is compatible with a range of distributed application development tools and computing environments, such as JAVA/RMI (Remote Method Invocation) and the Common Object Request Broker Architecture (CORBA) Interface Definition Language (IDL) standards. In at least some exemplary implementations, the distributed application contract is an IDL contract that specifies the desired distributed application functionality via its interface and method definitions. The proxy generator reads the IDL contract and generates output code that when compiled results in an generated proxy that provides the required application interface and automatically includes error handling facilities. The particular errors provided for in the generated proxy conform to the exception definitions specified in the IDL contract, and to the various types of implicit errors provided for in the configuration file, and/or for those errors identified by default within the proxy generator.

DETAILED DESCRIPTION OF THE INVENTION

Much of the detailed description that follows focuses on the use of the Java programming language in the context of developing CORBA/IDL-based distributed applications. However, the inventive proxy generator is directly applicable to other distributed application development environments and other programming languages. For example, one might implement the inventive proxy generator in a distributed application development environment using Java/RMI (Remote Method Invocation), which might be advantageous where the different client/server software components (objects) are all Java-based.

Figure 1:
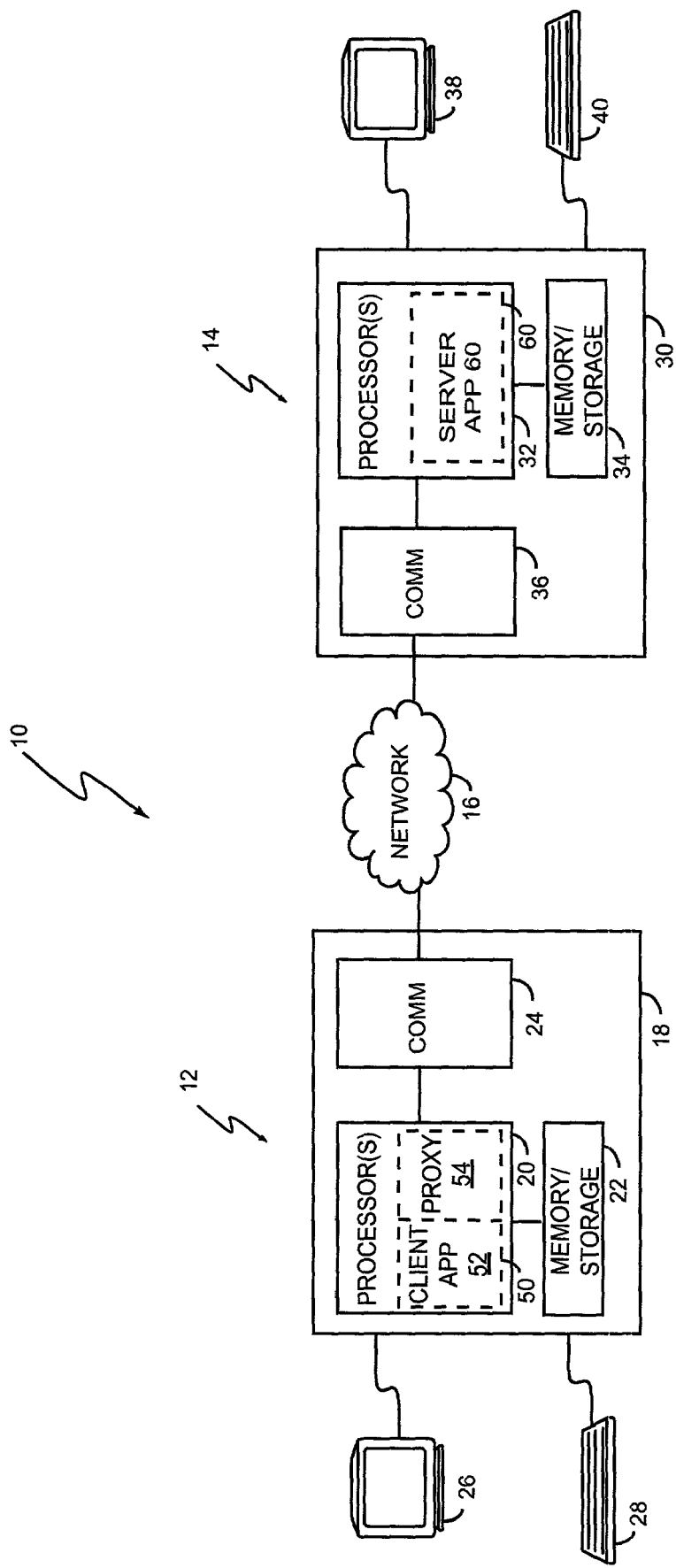
FIG. 1 is a diagram of an exemplary computing environment for supporting distributed application computing in accordance with the present invention.

Turning now to the drawings, FIG. 1 illustrates a distributed application environment 10, wherein one or more client systems 12 communicate with a server system 14 through a network 16. Details of the network 16 are not material to understanding the present invention, and the different approaches to linking computer systems together are well understood by those skilled in the art. Thus, it is sufficient to note that the network 16 might range from a simple cable connecting the client system 12 and server system 14, to a sophisticated network (local and/or wide area).

In this exemplary embodiment, the client system 12 comprises a computer 18 including one or more processors 20, memory/storage 22, and a communication interface 24, and is associated with a display unit 26, and a keyboard and/or other input/output device 28. Similarly, the server system 14 comprises a computer 30 including one or more processors 32, memory/storage 34, and a communication interface 36, and is associated with a display 38, and one or more input/output devices 40.

One should understand that the architecture and arrangement of client and server systems 12 and 14 shown here is exemplary, and is subject to substantial variation. For example, the client system 12 might range from a traditional personal computer (PC), to a mobile computing device, such as an intelligent mobile phone or other type of mobile station, a hand-held PC, personal digital assistant (PDA), or some other type of processing terminal.

In the context of the distributed applications developed in accordance with the present invention, the client system 12 hosts a client-side application 50 that includes a client application 52, and a generated proxy 54 developed in accordance with details appearing later herein. The server system 14 hosts a server application 60 that provides processing support to the client-side application 50. Such processing support typically is defined by the functionality defined within a distributed application contract.

Figure 2:
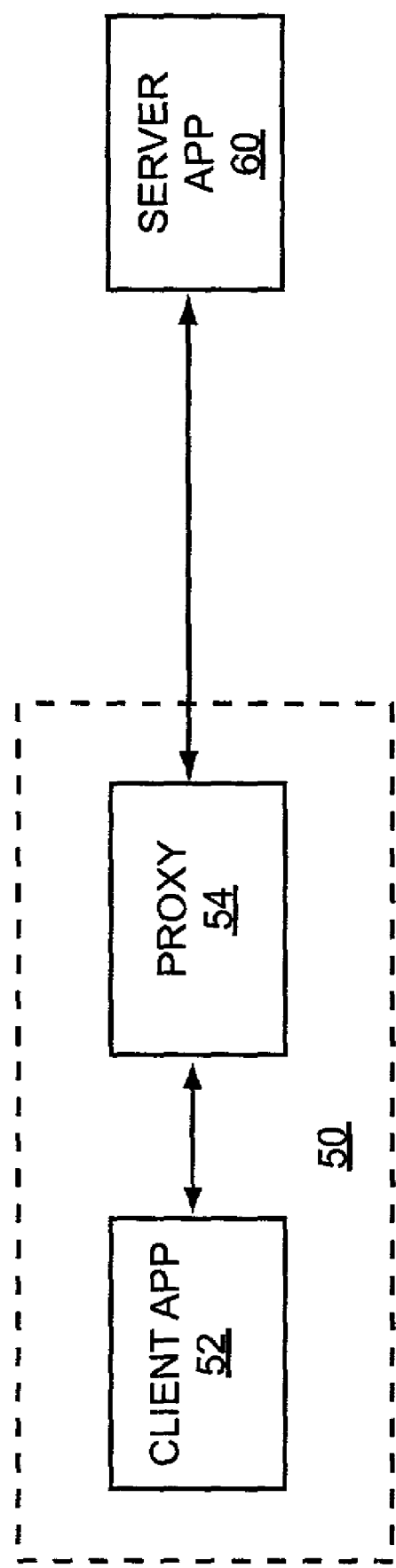
FIG. 2 is a simplified diagram illustrating the client-server components of the distributed application of FIG. 1.

FIG. 2 provides an exemplary but simplified representation of the logical relationship between the elements of the client-side application 50 and the server application 60. As shown, the generated proxy 54 logically interfaces the client application 52 with the server application 60, with such an arrangement offering many attendant benefits. For example, use of the generated proxy 54 shields the client application from much of the overhead and complication associated with remote computing, i.e., distributed computing between networked computer systems. In more detail, the complexity associated with remotely invoking server operations via the network 16, and with managing communication errors inevitably encountered in distributed processing, can be addressed in the proxy rather than in the client application.

While admittedly simplifying the client application 52, use of the generated proxy 54 seems, in some sense, like merely "shifting" the problem of dealing with distributed application complexity around rather than solving it. However, some simplification is gained by developing the proxy with a focus on supporting the mechanics of running client-side operations of the distributed application, and developing the client application 52 with a focus on supporting the actual functionality desired for the client side of the distributed application. Further, the generated proxy 54 allows, in some embodiments, the client application 52 to operate in a manner otherwise incompatible with the server application 60. Therefore, the client application 52 need not necessarily be developed in consideration of any particular distributed application protocol.

Figure 3:
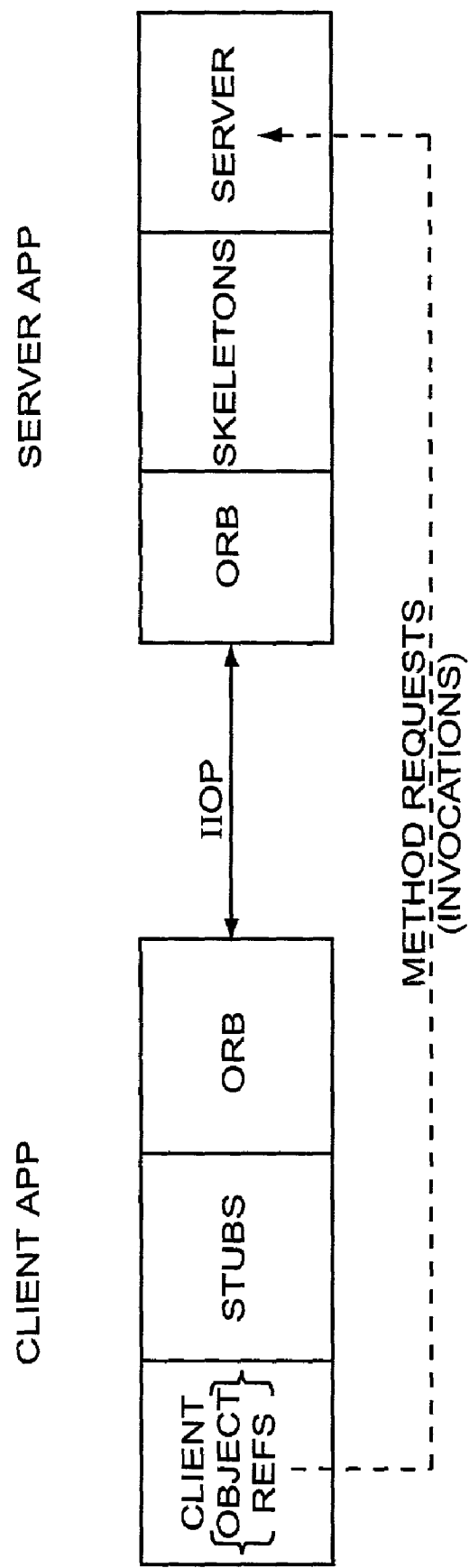
FIG. 3 is a diagram of a conventional CORBA-based client-server distributed application.

For comparison, FIG. 3 shows, in a CORBA context, a conventional distributed application comprising a client program with no proxy that is directly interfaced with the server program. Internet Inter-Orb Protocol (IIOP) supports "remoting" software objects such that a remote client gains access to the exposed portions of a remote object (e.g., server-based), which typically comprises an arrangement of data (public and hidden), in combination with one or more functions associated with that data. Note that RMI and DCOM represent an alternative approaches to distributed application invocations.

With use of a client-side proxy, the overhead associated with managing the transmission of requests from the client side to the server side, and with receiving server responses at the client side, the actual client application 52 is, as noted above, greatly simplified. Many of the benefits associated with the use of client-side proxies are well known by those skilled in the art of distributed software application development. However, the approaches heretofore used in proxy development generally placed a substantial programming burden on the programmer(s) tasked with writing and compiling the code to create the proxy.

A further and often continuing burden regarding maintenance generally arises with the use of distributed applications. For example, if the desired functionality of the distributed application changes even slightly, programmers generally are forced to revise both the client- and server-side applications to reflect such revisions. Where manually coded proxies are used, such changes generally force programmers to manually update proxy source code, and then recompile the various portions of the distributed application.

Figure 4:
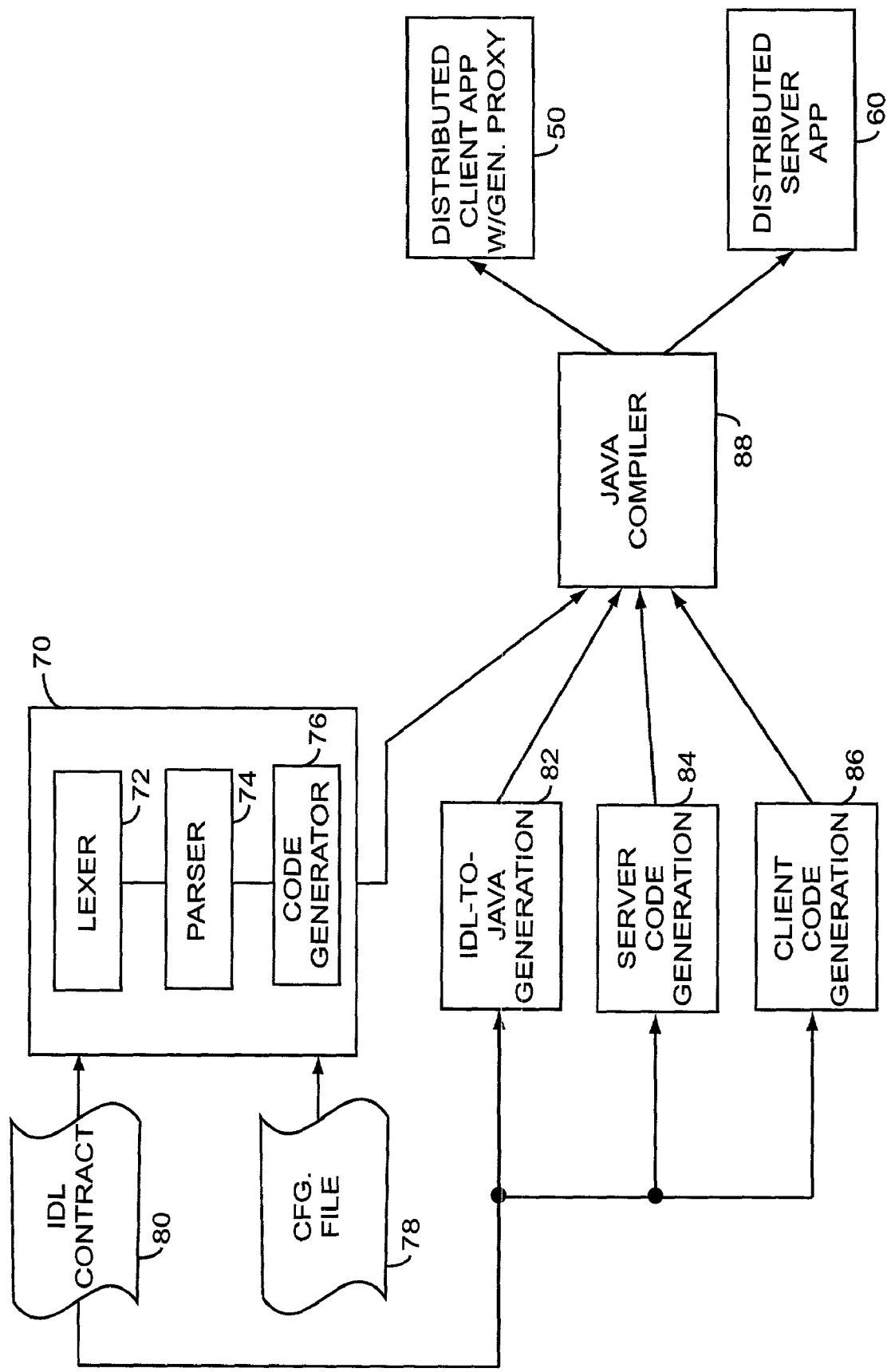
FIG. 4 is a diagram of an exemplary embodiment of the proxy generator of the present invention.

Proxy generation in accordance with the various inventive approaches discussed herein offers numerous advantages including, but not limited, more rapid distributed application development, automatically generated error handling, and reduced maintenance burden. FIG. 4 illustrates an exemplary embodiment of a proxy generator 70 that may be used to gain these and other benefits.

Usage of proxy generator 70 embodies an approach for automatic generation of distributed application proxies that is readily adapted to the details of a particular distributed application development project. Here, the proxy generator 70 comprises a lexer 72, a parser 74, and a code generator 76. Shown in the context of an exemplary code development environment, the proxy generator 70 interfaces with a configuration file 78, a distributed application contract (DAC) 80, and a software language compiler 88. Note that the diagram assumes a Java-based, CORBA/IDL development environment, but other types of development environments might be used, e.g., JAVASOFT's Java/Remote Method Invocation (Java/RMI), or MICROSOFT's Distributed Component Object Model (DCOM), or others.

In any case, the illustration further shows the compiler 88 receiving input from an IDL-to-Java generator 82, a server code generation function 84, and a client code generation function 86. The server and client code generation functions 84 and 86, respectively, may represent manual coding operations performed by one or more programmers. Code output by blocks 82, 84, and 86, in combination with that output from the code generator 76 of proxy generator 70, is processed (compiled) by compiler 88 to form the distributed software application of interest, which comprises the client-side application 50 and the server application 60, introduced earlier.

While the DAC 80 is shown as an input to the code generation functions 84 and 86, these functions may be implemented as manual coding processes, wherein one or more programmers use the DAC 80 as a reference or guide for writing the necessary client/server application code. By using proxy generator 70 to automatically generate the proxy portion of the client-side application 50, the programming burden is significantly reduced, and application robustness is improved through, among other things, the ability of the generated proxy 54 to reliably process and/or respond to both recoverable and non-recoverable errors.

The proxy generator 70 is subject to variation in implementation, but here comprises the lexer 72, parser 74, and code generator 76 noted above. The lexer 72 reads the input stream from the DAC 80, which input stream represents the desired distributed application functionality. With IDL, the DAC 80 includes one or more named interfaces, which are optionally enclosed in modules that provide "namespacing" functionality, and which correspond to like named server objects that will form part of the distributed application. Thus, the IDL contract generally includes an interface description for each of these objects to identify the functions and their associated known error conditions and data that are available from or associated with the corresponding software object. The IDL contract can and usually does include many other constructs besides the interfaces, which generally must be understood by the proxy generator 70. Note that some implicit error conditions must be explicitly declared.

Ultimately, the various interfaces, methods, and data types involved are mapped into the supported constructs of the particular programming language being used, which, here, is Java. However, at this point, the lexer 72 simply "tokenizes" the input string for scrutiny by the parser 74. Parsing in the context of proxy generation involves more than simply determining whether the input information conforms to the syntactical requirements of the chosen computer language (e.g., JAVA, C++, etc.). Indeed, the parser 74 processes the tokens output from lexer 74 and assembles them into meaningful "sentences."

More particularly, the parser 74 forms data constructs or structures representing the functionality of the DAC 80. Such data structures may be in the form of an Abstract Syntax Tree (AST), which may be traversed by the code generator 76 to produce compilable computer code, e.g., JAVA code. In any case, from the parsed content, proxy generator 70 builds the necessary data structures representing the distributed application functionality and the supporting error handling functionality. That is, the parsing process is adapted such that parsing intelligently recognizes modules, interfaces, exceptions, and other software constructs in the DAC 80.

In one approach, the proxy generator 70 is itself built using JAVACC and JJTree compiler development tools. Compiler development tools often minimally require a grammar for a language as input, and produce a lexer and a parser that can approve or disapprove of an input according to whether or not it follows the language specified in the grammar. To develop a more meaningful compiler, that is, one that is capable or saying more than "yes" or "no" to a given input, it is necessary to significantly supplement the raw specification of a language grammar with code that is able to form the data structures and perform traversal algorithms on an input while it is being parsed or compiled. Consequently, in at least some exemplary embodiments of the present invention, the IDL grammar included with the distribution of the JAVACC and JJTree compiler development tools is significantly modified, enabling the proxy generator 70 to lex and parse IDL, and to build meaningful data structures with associated traversal algorithms for a given input.

The code generator 76 processes the output from parser 74 using built-in rules, which may be supplemented by information from the configuration file 78. While some or all of the information in the configuration file can be included within the proxy generator 70 as default or hard-coded information, usage of the configuration file imparts significant convenience by allowing developers to tailor code generation based on simple changes to configuration file information.

In general, the configuration file includes information regarding the location of the server implementation corresponding to the client application for which the proxy is being generated. Such information may be expressed as a network address or, perhaps, as the location of a file that contains server implementation information. Such address information might comprise, for example, the Uniform Resource Locator (URL) of the server implementation. In other approaches, the server information may be expressed in terms of a "nameserver," or in other "namespace" terms, which are familiar to those skilled in the art of distributed application development. For example, the CORBA COS (Common Object Services) Naming Service provides for object references using a tree-based directory that is similar to the directory structures associated with file systems and wherein objects are stored within namespaces by name. For a distributed application client to use COS naming, the configuration file 78 may be used to provide the generated proxy 54 with name and port information regarding the remote host running or having access to the naming service of interest.

Of significant further interest, the configuration file 78 may, as noted earlier, include one or more values related to error handling. For example, for certain types of errors that might be encountered during distributed application operations, it might make sense to provide for a certain number of "retries," based on the idea that such errors might arise from transient conditions and so might be overcome by re-attempting the failed operation. A network communication failure represents a simple example of the sort of error that might be overcome through this "retry" approach. As such, the configuration file allows the developer to specify which errors are subject to retry, and further to specify the retry behavior for such errors, i.e., the number of retries.

Whether default or configuration-file values are used, the code generator 76 outputs proxy code that, once compiled in combination with the client application code, insulates the actual client application from the communication mechanisms that transport data between the client application 40 and the server application 60. That is, the generated proxy 54 shields, in a CORBA-based distributed application, the client application 52 from the details of CORBA, such that the client application code may be greatly simplified. More particularly, the generated proxy 54 can handle the remote method invocations supporting interaction with the server application 60 rather than the client application 52 dealing with such complexities.

Figure 5:
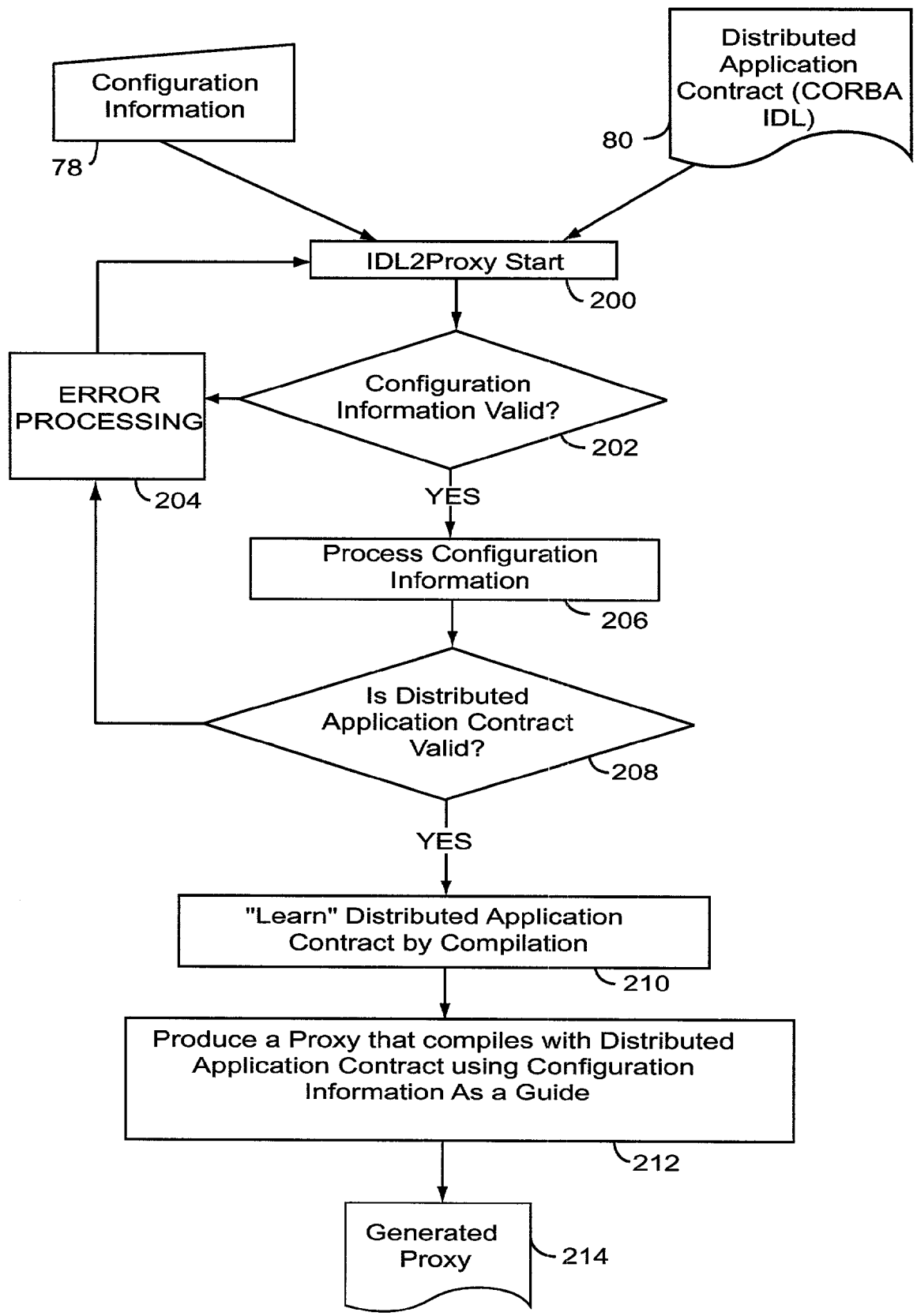
FIG. 5 is an exemplary flow diagram illustrating proxy generation functions of the proxy generator of FIG. 4.

FIG. 5 illustrates exemplary logic embodying the above processes. Operation begins (Step 200) with the proxy generator 70 determining whether the configuration file 78 is valid (Step 202). If the file is invalid, the proxy generator 70 performs selected error processing (Step 204), which may entail generating an error or debugging report written to a log file and/or output to a display device as an aid to the programmer. At that point, program execution might halt with the proxy generator returning to its program start condition (Step 200). If the configuration file 78 is valid, the proxy generator processes the configuration information contained therein (Step 206).

Next, the proxy generator 70 evaluates the DAC 80 to determine whether it is valid, e.g., whether it contains valid interface definitions (Step 208). If the contract (DAC 80) is not valid, the proxy generator 70 performs selected error processing (Step 204). If the DAC 80 is valid, the proxy generator 70 continues by "learning" the distributed application functionality based on compiling the DAC 80 (Step 210). Compilation of the DAC 80 incorporates control/configuration settings, definitions, and other information from the configuration file 78 as noted earlier (Step 212), with such processing by the proxy generator 70 resulting in the output of the generated proxy 54 (Step 214). It should be understood that the compilation process itself might discover certain types of errors, such as semantic errors, which might cause the generation process to halt.

Figure 6:
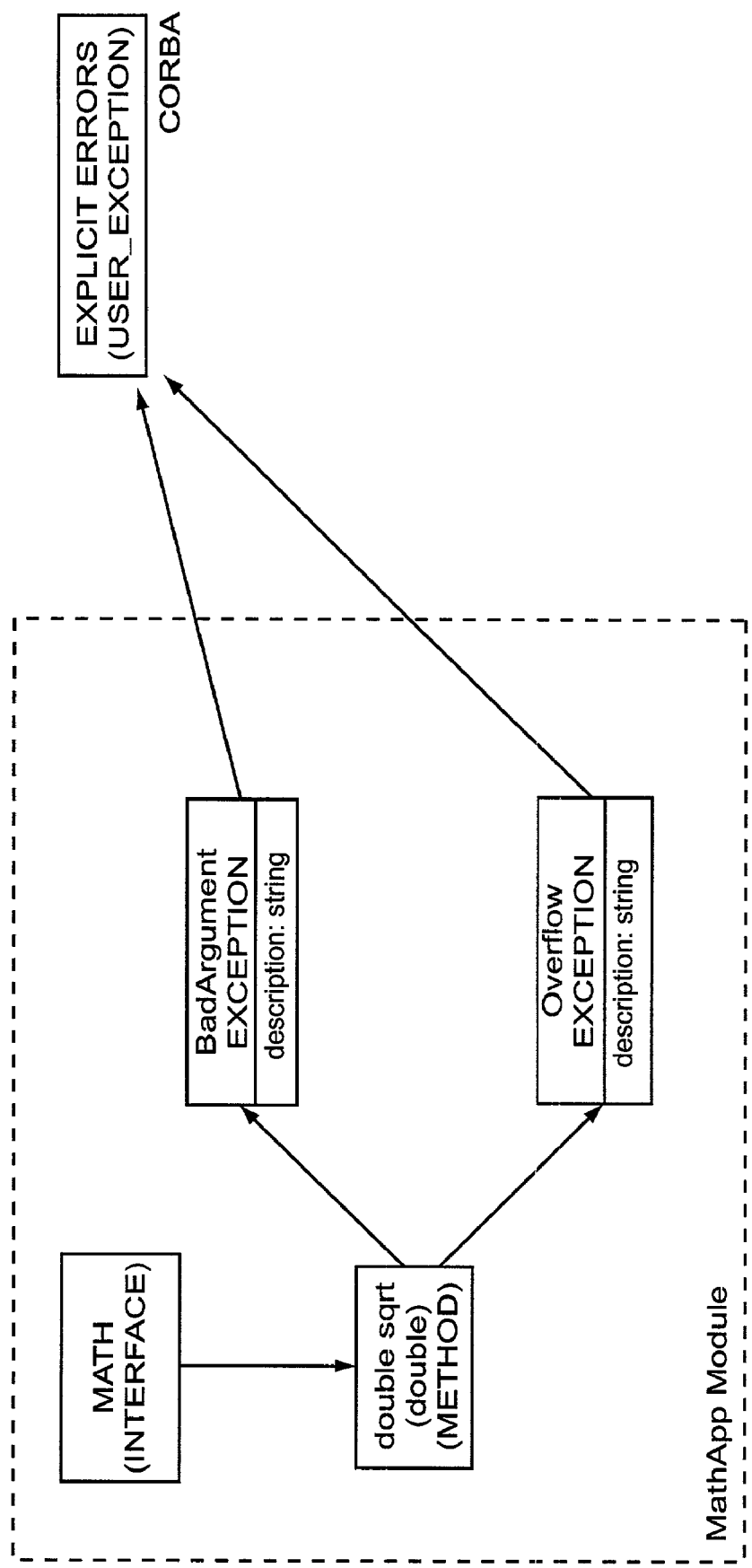
FIG. 6 is a diagram of a simplified but exemplary distributed application contract.

FIG. 6 illustrates an exemplary software module structure, MathApp, as might be included in a hypothetical, albeit greatly simplified, DAC 80. As illustrated, module MathApp comprises an IDL interface entitled "Math," which defines one distributed method entitled "sqrt," which is identified as accepting a type double argument and returning a type double value. Further, and, of particular interest here, module MathApp defines to explicit-type errors, "BadArgumentException" and "OverflowException." Each of these explicit errors (org.omg.CORBA.USER_EXCEPTION) includes a string parameter, which, in this hypothetical example, is used to convey specific error information. The source code for module MathApp is given as,

```
module MathApp
{
        exception BadArgumentException
        {
                string description;
        };
        exception OverflowException
        {
                string description;
        };
        interface Math
        {
                double sqrt (in double arg)
                        raises(BadArgumentException, OverflowException);
        };
};
```
            The server code corresponding to the DAC 80 for implementation as server application 60 is expressed as,
```
//
//MathServer.java
//
import java.io.*;
import org.omg.CORBA.*;
import MathApp.*;
class MathServant extends MathApp._MathImplBase
{
    /**
    * sqrt uses the library call Math.sqrt
```

-continued

```
             * to compute the square root of its
             * argument
             * @param arg The argument to the square root routine
             * @return the square root of the argument
             *
              **/
        public double sqrt (double arg) throws
                BadArgumentException,
                OverflowException
        {
                if(arg < 0) {
                        throw new BadArgumentException("Argument:" + arg +
                        " < 0");
                }
                if(arg > 1024) {
                        throw new OverflowException("Argument: " + arg +
                        " > 1024");
                }
                return java.lang.Math.sqrt(arg);
        }
}
public class MathServer {
    public static void main(String args[ ])
    {
            try{
                    // create and initialize the ORB
                    ORB orb = ORB.init(args, null);
                    // create servant and register it with the ORB
                    MathServant mathRef = new MathServant ( );
                    orb.connect (mathRef);
                    // stringify the mathRef and dump it in a file
                    String str = orb.object_to_string(mathRef);
                    String filename = "math.ior";
                    FileOutputStream fos = new FileOutputStream(filename);
                    PrintStream ps = new PrintStream(fos);
                    ps.print(str);
                    ps.close( );
                    // wait for invocations from clients
                    java.lang.Object sync = new java.lang.object( );
                    synchronized (sync) {
                            sync.wait( );
                    }
            } catch (Exception e) {
                    System.err.println("ERROR: " + e);
                    e.printStackTrace(System.out);
            }
    }
}
```

The client code corresponding to the DAC 80 for implementation as client application 52 is expressed as,

```
//
//MathClient.java
//
import java.io.*;
import org.omg.CORBA.*;
import MathApp.*;
public class MathClient
{
    public static, void main(String args[ ])
    {
        try{
            MathProxy p = MathProxy.getInstance( );
            BufferedReader consoleReader = new BufferedReader(
                    new InputStreamReader (System.in)
            );
            System.out.println("Enter arguments to the remote square root
                        service");
                while(true) {
                System.out.println("Enter a number:");
                    System.out.print("=> ");
                String s = consoleReader.readLine( );
                    double d = Double.parseDouble(s);
                    try {
                    System.out.println(p.sqrt(d));
                } catch(ProxyException pe) {
                    System.out.println("Caught unexpected: " +
                            pe.getDescription( ));
                }
            }
```

```
        } catch (Exception e) {
            System.out.println("ERROR : " + e) ;
            e.printStackTrace(System.out);
        }
    }
}
```

Note that the above source code illustrates the client application 52 using the exception handling capabilities of the generated proxy 54 to provide the user with information regarding errors.

An exemplary configuration file 78 supporting the above IDL might include specific error handling information for one or more implicit errors, e.g., system errors.

For example, the configuration file 78 may be expressed as,
   application.ior.location=file://math.ior
   proxy.retry=org.omg.CORBA.COMM_FAILURE,
     org.omg.CORBA.OBJECT_NOT_EXIST One sees that the configuration file 78 above includes information identifying the location of the distributed application, as well as relatively simple error handling configuration information, which specifies communication retry failure handling characteristics. Such information is used by the proxy generator 70 to control the error handling code in the generated proxy 54. Specifically, the illustrated configuration information controls the manner in which the generated proxy 54 responds to communication failures on the network 16 that interfere with client-server communication.

The corresponding JAVA code for the generated proxy 54 is as follows:

```
package MathApp;
import org.omg.CORBA.SystemException;
    public class MathProxy
    extends Proxy
    {
        //interface body
        private static MathProxy _singleton = null;
        private Math _corbaFacadeObj = null;
        public final static MathProxy getInstance( ) throws
SystemExceptionProxy {
            if(_singleton==null) {
                init( );
                _singleton = new MathProxy( );
                _singleton.refresh( );
            }
            return _singleton;
        }
        private final void refresh( ) throws SystemExceptionProxy {
            refreshHandles ("Maths");
            _corbaFacadeObj = getHandle( );
        }
        private final Math getHandle( ) throws SystemExceptionProxy {
            return MathHelper.narrow(getFacade("Math"));
        }
        public double sqrt (double arg) throws
            SystemExceptionProxy
            ,BadArgumentExceptionProxy
            ,OverflowExceptionProxy
        {
            try {
                try {
                    return _corbaFacadeObj.sqrt(arg);
                } catch(systemException sysEx) {
                    if( isCorbaObjectStale( sysEx ) ) {
                        refresh( );
                        return _corbaFacadeObj.sqrt (arg);
```

```
                    } else {
                        throw sysEx;
                    }
                }
            } catch (SystemException e0) {
                throw new SystemExceptionProxy(e0);
            } catch (BadArgumentException e1) {
                throw new BadArgumentExceptionProxy(e1);
            } catch (OverflowException e2) {
                throw new OverflowExceptionProxy(e2);
            }
        }
    } /* MathProxy */
```

Figure 7:
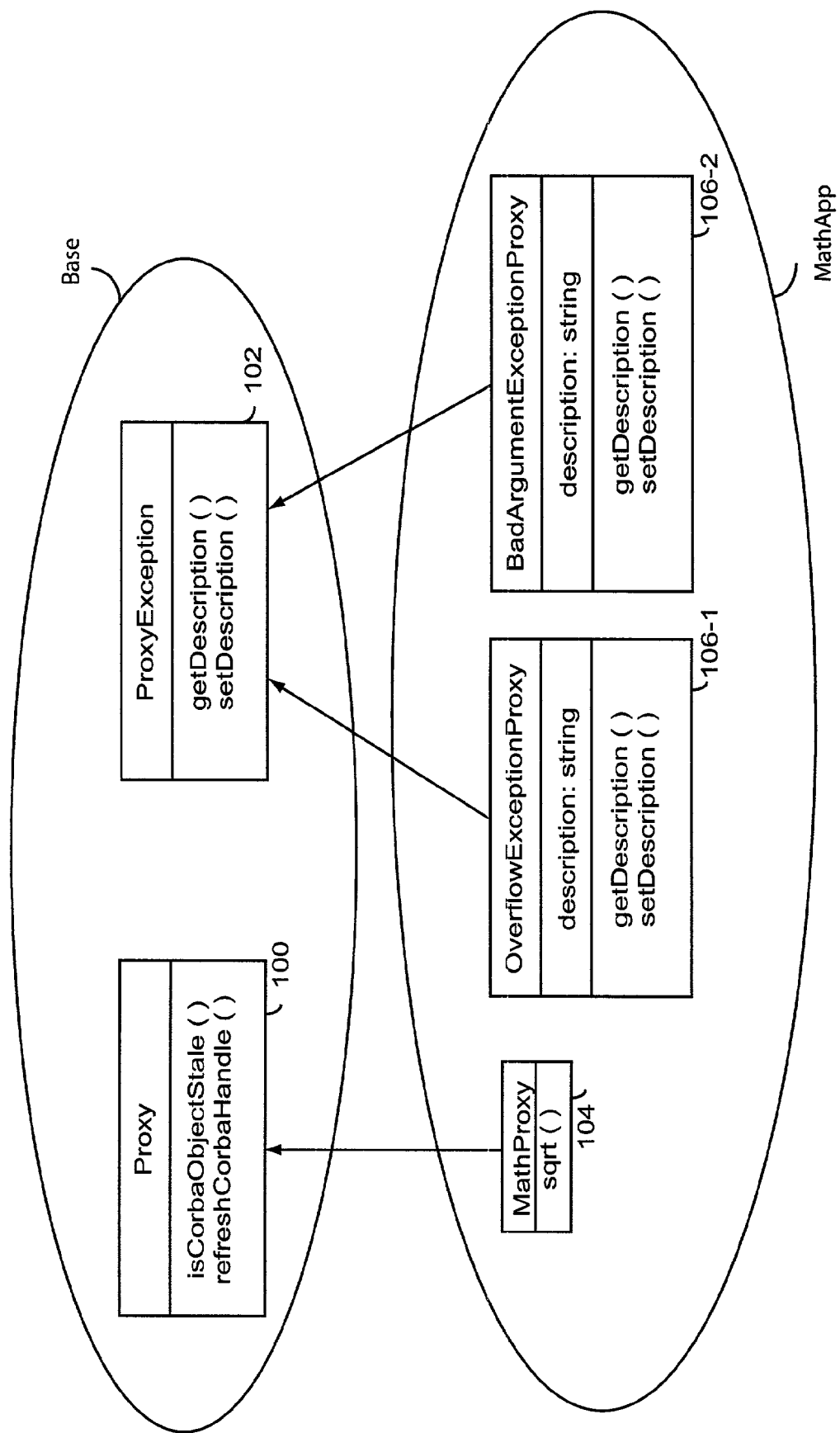
FIG. 7 is a diagram of exemplary class derivations performed during proxy generation relative to the contract of FIG. 6.

Of course, the above listings are exemplary only, and the output from the proxy generator 70 will vary in accordance with application needs. Regardless, FIG. 7 illustrates a simplified, exemplary generated proxy structure as might be generated by proxy generator for the above-identified DAC 80. In operation, the proxy generator uses a number of built-in, base classes from which it generates one or more derived classes that form the foundation of the automatically generated proxy code.

Moreover, the particular methods and their details for a given distributed application, as obtained from the DAC 80, are used to generate output classes with corresponding supporting methods and data directly coded into them. Such action imbues the generated proxy 54 with significant run-time performance advantages as compared to other solutions, such as those relying on run-time dynamic method determination.

In the illustration, proxy generator 70 includes or otherwise has access to pre-defined base classes including, but not limited to, a base interface class, Proxy class 100, and a base exception class, ProxyException class 102. Proxy class 100 generally includes methods to lookup remote distributed object implementations, and to refresh its own list of client handles. ProxyException class 102 generally includes methods for getting and passing detailed error information using uniformly defined query methods, such that the client application 52 is simplified in terms of accessing error information from the generated proxy 54.

Continuing the MathApp example, the proxy generator 70 derives MathProxy class 104 from base Proxy class 100. Thus, MathProxy 104 is a derived interface class that inherits properties and methods from Proxy class 100, and further includes interface definitions and methods from the MathApp module in DAC 80. More particularly, MathProxy class 104 includes versions of the methods defined by MathApp, and additionally includes needed distributed application features (CORBA provisions).

With this approach, the proxy generator 70 creates a simplified API for presentation to the client application 52, which substantially adheres to the original DAC 80 in terms of function/method calling conventions and argument/return types, but modifies the client API to provide access to the proxy exception errors. That is, the generated proxy 54 now throws or otherwise raises BadArgumentExceptionProxy and OveflowExceptionProxy exceptions rather than the Overflow and BadArgument exceptions defined in the Math interface of DAC 80. These two exceptions are thrown by the derived exception classes, OverflowException class 106-1 and BadArgumentException class 106-2. Internally, the proxy generator 54 conforms its server interface to the DAC 80.

Figure 8:
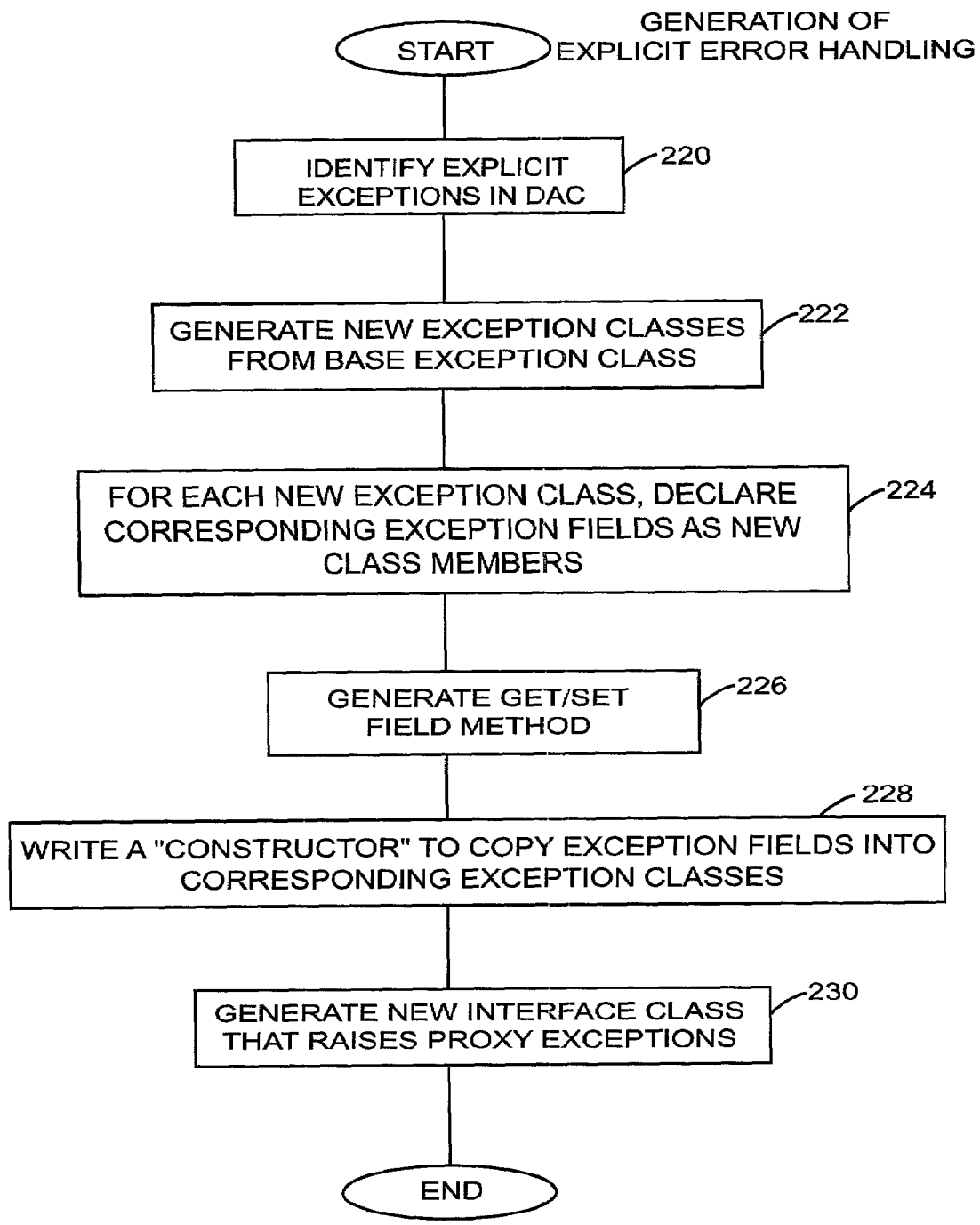
FIG. 8 is a flow diagram of exemplary logic for proxy generation as regards explicit error handling.

Proxy generator 70 derives the above two classes from the base ProxyException class 102, such that a derived proxy exception class exists for each like-named exception originally defined within the Math interface in DAC 80. FIG. 8 treats this derivation of proxy exception classes in more detail.

Within the context of FIG. 8, the proxy generator 70 identifies explicit exceptions declared within the DAC 80 (Step 220). Thus, for each of the identified exceptions, the proxy generator a corresponding derived ProxyException class 106 (e.g., 106-1, -2, and so on). For each derived ProxyException class 106, the proxy generator 70 declares all fields within the corresponding exception defined in DAC 80 as new class members (Step 224), and then generates methods to "get" and "set" these various fields (Step 226). As part of the construction process, all of the fields from each explicit exception in DAC 80 are copied into the corresponding derived ProxyException class 106.

The proxy generator 70 may further derive implicit error handling methods from a base "SystemExceptionProxy" class (not shown in FIG. 7). As explained, some system exceptions might be transient in nature, while others are more likely to be persistent. For the potentially transitory system exceptions for which recovery/retry handling is desired, the proxy generator 70 generates error-handling code, which appears as explicit invocation code within the derived MathProxy class 104. Such invocations trap failures considered as "transitory" and explicitly retry the invocations in accordance with configured retry values, which might be default values or might be obtained from the configuration file 78. Other failure behaviors might be configurably defined, such as error message generation. Where retry attempts are not successful, the generated proxy 74 might simply pass along meaningful error information regarding the failure to the client application 52 using, for example, query and internationalization methods similar to those defined for passing along explicit error information to the client application 54.

With the above scheme in mind, one sees that the original sqrt method defined in the Math interface of DAC 80 is replicated within MathProxy 104, but invocation of this method is now "wrapped" in error handling code that, if desired, can retry potentially recoverable implicit errors. Further, where invocation of the sqrt method within MathProxy 104 results in an explicit error, the generated proxy 54 declares a new instance of the corresponding proxy exception class, either OverflowExceptionProxy class 106-1 or BadArgumentExceptionProxy class 106-2. The generated proxy 54 then initializes the newly declared exception class as described above, and returns error information to the client application 54.

Note that the newly instantiated exception class contains all of the information encoded in the corresponding exception declared within the Math interface of DAC 80. That is, OverflowExceptionProxy class 106-1 includes all of the information available in the Overflow exception defined in the Math interface of DAC 80. That is, OverflowExceptionProxy class 106-1 includes the same exception fields (i.e., error description string) originally defined in the DAC 80, and further provides get and set methods allowing the setting and querying of that field information in a uniform manner. Of course, the same functionality is available with the BadArgumentExceptionProxy class 106-2.

With the above class descriptions, the following exemplary code represents the base classes for deriving Proxy, SystemException, and ProxyException classes, respectively:

```
Proxy
    package MathApp;
    import org.omg.CORBA.*;
    import java.io.*;
    public class Proxy {
        private static ORB orb;
        private static org.omg.CORBA.Object o = null;
        public Proxy( ) {
        }
        public synchronized static void init( ) {
            orb = ORB.init(new String[ ] {"Proxy"},null);
        }
        public org.omg.CORBA.Object getFacade(String s) {
            return o;
        }
        public boolean isCorbaObjectStale(Exception e) {
            if(e instanceof org.omg.CORBA.COMM_FAILURE ||
                    e instanceof org.omg.CORBA.OBJECT_NOT_EXIST
                ) return true;
            return false;
        }
        public void refreshHandles (String s) {
            refresh( );
        }
        private void refresh( ) {
            String filename = "math.ior";
            try {
                BufferedReader br = new BufferedReader (new FileReader(filename));
                String ior = br.readLine( );
```

-continued

```
            o = orb.string_to_object(ior);
        } catch(java.io.IOException ioe) {
            ioe.printStackTrace( );
        }
    }
}
SystemExceptionProxy
    package MathApp;
    import org.omg.CORBA.SystemException;
    public class SystemExceptionProxy extends java.lang.Exception {
        public SystemExceptionProxy(SystemException e) {
            super(e.getMessage( ));
        }
        public SystemExceptionProxy( ) {
            super( );
        }
    }
ProxyException
    package MathApp;
    public abstract class ProxyException extends java.lang.Exception
    {
        public ProxyException( ) {
            super( );
        }
        public ProxyException(String s) {
            super(s);
        }
        public String getDescription( ) {
            return getdescription( );
        }
        protected abstract String getdescription( );
    }
```

Proxy is the base class for the generated Proxy code, and contains basic functionality needed by a distributed application client that uses a proxy. SystemExceptionProxy is a container, at least in the context of this example, for "org.omg.CORBA.SYSTEM_EXCEPTION" errors. Such errors are implicit (run-time) that occur without warning and without requiring explicit definition by the application. ProxyException is, as noted above, the base class for the generated, derived ProxyException classes. This base class may be customized in essentially any desired fashion to provide the derived exception classes with very sophisticated error handling.

All of the above base classes, and others, may be included within proxy generator 70, in which case proxy generator 70 uses these built-in base classes to generate the derived proxy, system exception, and proxy exception classes used in the generated proxy 54. In other exemplary embodiments, base class information may be included in the configuration file 78, or in one or more other files to which the proxy generator 70 has access. Inclusion of the base class information in an external file has the advantage of offering the developer additional flexibility regarding the base classes. That is, with the base class information exposed, the developer is free to tailor the base classes or otherwise customize them to suit the needs of a specific proxy application.

With the above error handling approach, the generated proxy 54 handles explicit errors encountered during execution of the distributed application, and makes information regarding such errors available to the client application 52 via a uniform interface. Such an arrangement simplifies the client application 52 because querying generated proxy 54 for explicit error information is simplified. Indeed, the approach to explicit error handling as described above not only simplifies the client application 52, it, in an overall sense, increases the robustness of distributed application error handling by allowing explicit errors information to be retained, and then queried or introspected at a high level without loss of detailed error information.

Figure 9:
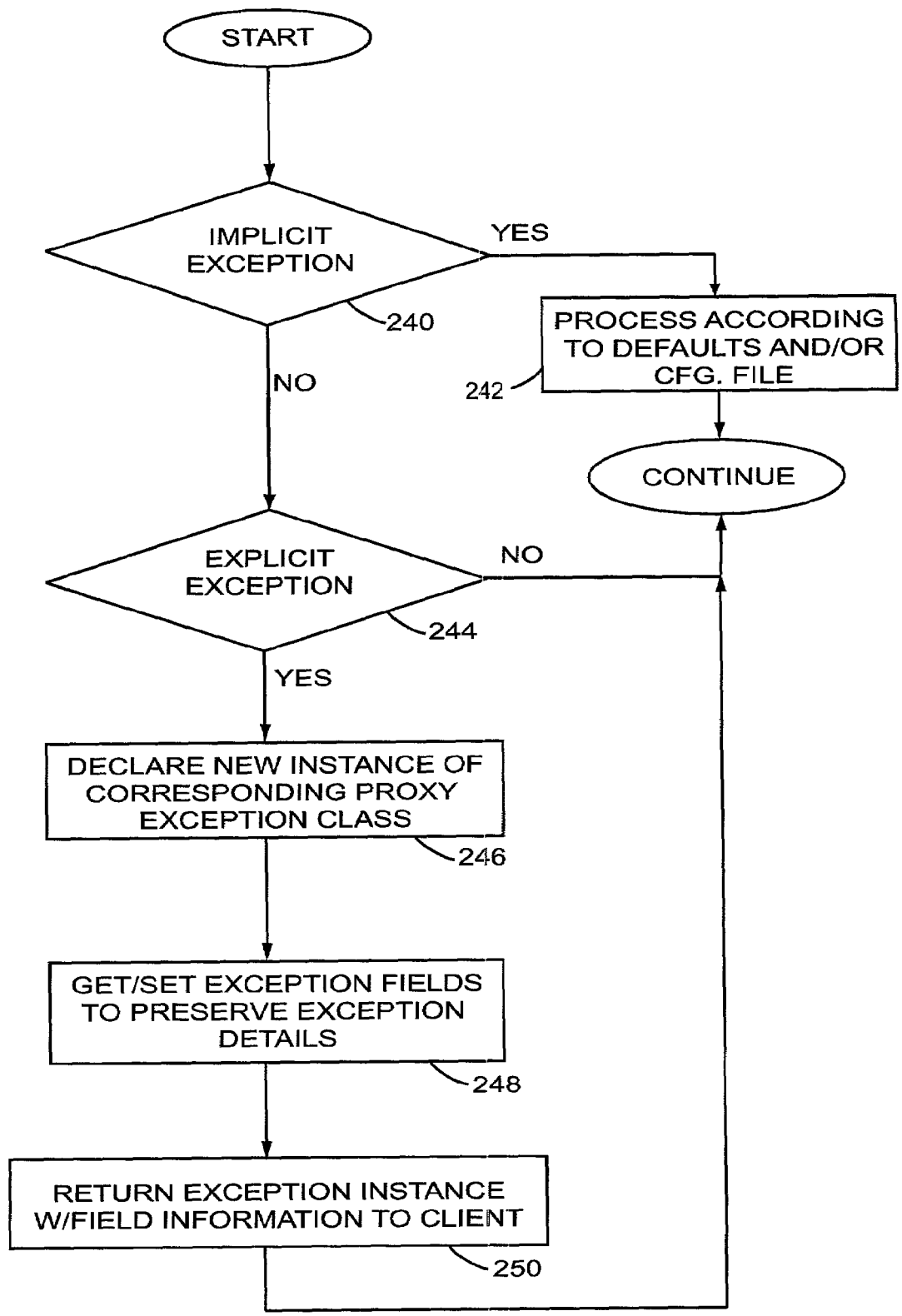
FIG. 9 is a flow diagram of exemplary logic for implicit/explicit error handling by the generated proxy.

FIG. 9 illustrates a simplified but exemplary overview of the above error handling approach. During execution of the distributed application, the generated proxy 54 checks for implicit and explicit errors. If an implicit error is encountered (Step 240), the generated proxy 54 processes the error according to default or configuration file information (Step 242), and processing continues. Here, continuation of processing does not necessarily connote successful error recovery through retry attempts, and includes the possibility of terminating the overall client-side application 50 and/or passing along error information to the client application 52.

The generated proxy 54 also checks for explicit errors (Step 244). If no such errors are encountered, processing continues. However, if an explicit error exception is raised, the generated proxy 54 declares a new instance of the appropriate derived exception class 106 (Step 246), initializes the new exception fields with the values from the old CORBA exceptions to obtain and preserve error information (Step 248), and returns the new exception to the client application 52 (Step 250). Processing then continues.

Those skilled in the art will appreciate that the above logic flow uses a sequential arrangement for clarity of illustration. However, it should be understood that explicit/implicit error handling are not necessarily dependent processes and the responses and actions of the generated proxy 54 as illustrated in FIG. 9 can and often will occur in a different order, or in parallel, depending upon the actual errors encountered.

In general, the proxy generator 70 generates error-handling provisions for selected implicit errors as identified by default information and/or as identified by constants defined within the configuration file 78. Further, the proxy generator 70 generates error-handling provisions for explicit errors as represented by declared exceptions in the DAC 80.

In at least some exemplary embodiments, the proxy generator 70 derives exception classes from built-in base exception classes, such that the generated proxy 54 declares new instances of the appropriate derived class as errors are encountered at run-time. In concert with this scheme, the proxy generator 70 derives one or more interface classes from a base interface class. The derived interface classes include not only the functionality defined by the corresponding DAC 80, but further include invocations for the automatically generated error handling provisions, thereby allowing the generated proxy 54 to automatically handle errors as they are encountered.

While the above exemplary details focused on a relatively simple square root example function, it should be appreciated that many real-world distributed applications include significantly more complexity, with many potential areas of operation that give rise to exceptions. A more comprehensive listing of scripts, configuration files, and other source code material relevant to developing and running an exemplary proxy generator 70 are included in the attached Appendix 1, which forms a part of this disclosure. More particularly, Appendix 1 includes five sections:

I. Administrative: this section includes scripts and configuration files relevant to building and running an exemplary proxy generator;

II. JAVA Source: this section includes JAVA source code to support the proxy generator;

III. Grammar: this section includes an exemplary modified IDL grammar;

IV. Generated Proxy: this section includes a sample, exemplary proxy; and

V. Base Classes: this section includes exemplary base class information.

The simplified examples discussed above, along with the expanded code listings of Appendix 1, represent exemplary embodiments of the proxy generator 70. As was mentioned, automatic proxy generation may be adapted for a variety of distributed application environments, development tools, and programming languages. As such, the above details are exemplary and not limiting. Indeed, the present invention is limited only by the scope of the following claims, and the reasonable equivalents thereof.

```
5       SystemExceptionProxy.java
1       // -*- Mode: Java -*-
2       //================================================
        // FILE: SystemExceptionProxy.java
4       //
        // SERVICES:
6       //
        // DESCRIPTION: Java source code.
8       //
        //
10      //
        // (C) COPYRIGHT 2001 Ericsson Wireless Communications
        // Inc. All Rights Reserved.
12      //        Ericsson Wireless Communications Inc. Proprietary
        //================================================
14
        package com.ericsson.nms.cdma.rnm.confmgmt.lib.proxy;
16
        /**
18       * This is a static class (meaning that it is not dynamically
         * generated by IDL2Proxy). Any corba exception that cannot
20       * be classified as an explicitly thrown corba exception will be
         * recast as a CMServiceAppCommunicationFailureException
22       * and propagated to a higher level.
         **/
```

```
                                -continued
24      public class SystemExceptionProxy extends Exception
        {
26
        //================================================
28      /** Constructor
         *
30       *    @see related_class
         *    @param none
32       *    @throws none
         *
34      //================================================
        //
36      public SystemExceptionProxy( String str )
        {
38         super(str);
        }
40
        public SystemExceptionProxy
        (org.omg.COBRA.SystemException se)
42      {
           super(se.toString( ));
44      }
46      } //End Class
```

What is claimed is:

1. A method of automatically generating client side proxies with included error handling for supporting distributed applications, at the distributed application compile time, the method comprising:

parsing a distributed application contract to determine required functionality for a proxy to be generated;

determining recoverable error handling behavior desired for the proxy based on reading error handling information in an application developer-defined configuration file;

generating distributed client and server applications; and generating the proxy in accordance with the distributed application contract and the error handling information.

2. The method of claim 1, wherein parsing a distributed application contract comprises intelligently reading program constructs described within the distributed application contract to generate corresponding data structures from which the proxy is generated.

3. The method of claim 1, wherein determining recoverable error handling behavior comprises:

identifying an implicit error for which corresponding recovery information appears in the configuration file; and generating program instructions to be included in the proxy for processing the implicit error in accordance with the recovery information.

4. The method of claim 3, wherein the recovery information comprises a retry parameter specifying a number of times an error recovery procedure should be attempted by the proxy.

5. The method of claim 1, further comprising:

identifying explicit exceptions defined in the distributed application contract; and generating error handling provisions for inclusion in the proxy to support automatic handling of the explicit exceptions by the proxy.

6. The method of claim 5, wherein identifying explicit exceptions defined in the distributed application contract comprises parsing the distributed application contract to identify one or more explicit exceptions defined in the distributed application contract, and to further identify exception information associated with each of the one or more identified exceptions.

7. The method of claim 6, wherein generating error handling provisions for inclusion in the proxy to support automatic handling of the explicit exceptions by the proxy comprises:

for each identified explicit exception, deriving a proxy exception class that includes class members and fields populated using the exception information from the explicit exception in the distributed application contract; and including the derived proxy exception class in the proxy.

8. The method of claim 5, wherein generating error handling provisions for inclusion in the proxy to support automatic handling of the explicit exceptions by the proxy comprises deriving a proxy exception class for each explicit exception defined in the distributed application contract.

9. The method of claim 8, further comprising:

reading a configurable proxy exception base class from a configuration file; and deriving the proxy exception classes from the proxy exception base class.

10. A method of automatically generating a distributed application including a client side proxy at the time the distributed application is compiled, the method comprising:

providing a proxy base class that includes remote invocation functionality for supporting distributed application computing, a system exception base class that includes error handling for implicit exceptions, and a proxy exception base class that includes error handling for explicit exceptions;

deriving an application proxy class from the proxy base class based on parsing the distributed application contract;

deriving a system exception proxy class from the system exception base class for automatic handling of implicit exceptions;

deriving, for each explicit exception identified in the distributed application contract during parsing, a proxy exception base class from the proxy exception base class, wherein each derived proxy exception class is populated with explicit exception information from the corresponding explicit exception defined in the distributed application; and generating distributed client and server applications.

11. The method of claim 10, further comprising:

obtaining configurable error handling information from an application developer-defined configuration file; and modifying derivation of the system exception proxy class based on the configurable error handling information, such that an error handling behavior of the generated proxy for selected implicit exceptions may be configured using the configuration file.

12. The method of claim 11, wherein the error handling behavior is a retry parameter that defines a number of times the generated proxy retries an invocation associated with an implicit exception encountered during runtime by the generated proxy.

13. The method of claim 10, further comprising obtaining the base classes for deriving the system exception, proxy exception, and application proxy classes from an external file.

14. The method of claim 13, wherein the external file is a user-accessible configuration file, such that base class information is user-modifiable.

15. The method of claim 10, wherein deriving proxy exception classes for each identified explicit exception comprises:

determining methods defined for the identified exception in the distributed application contract;

generating corresponding methods as members of the derived proxy exception class; and importing fields defined for the methods into the corresponding class members.

16. A system for generating distributed software applications including client side proxies at compile time, the system comprising:

a distributed application contract (DAC) defining a desired distributed software application;

one or more base interface proxy classes that include distributed application functionality supporting remote invocation;

one or more base exception proxy classes that include error handling functionality supporting trapping and processing of exceptions;

a compiler to generate distributed client and server applications; and a proxy generator to generate a proxy that includes automated error handling by:

deriving one or more interface proxy classes corresponding to software interfaces defined by the DAC from the base interface proxy classes;

deriving one or more exception proxy classes corresponding to explicit exceptions defined in the DAC from the base exception proxy classes;

configuring the exception proxy classes to include exception methods and error information corresponding to like information defined by the explicit exceptions in the DAC; and configuring the interface proxy classes to raise the exception methods defined by the exception proxy classes upon encountering one or more of the explicit exceptions defined in the DAC.

17. The system of claim 16, wherein the base exception proxy classes include a system exception base class from which the proxy generator derives implicit error handling provisions for the generated proxy.

18. The system of claim 16, further comprising a configuration file including server implementation location information for the distributed software application, and wherein the proxy generator uses the server implementation location information in generating the proxy.

19. The system of claim 18, wherein the configuration file further includes error-handling information, and wherein the proxy generator configures the automatic error handling of the proxy based on the error handling information.

20. The system of claim 19, wherein the proxy generator configures the automatic error handling of the proxy based on the error handling information by configuring implicit error recovery behavior based on retry information contained in the configuration file.

* * * * *

UNITED STATES PATENT AND TRADEMARK OFFICE
CERTIFICATE OF CORRECTION

| | | |
|---|---|---|
| PATENT NO. | : 7,171,672 B2 | Page 1 of 1 |
| APPLICATION NO. | : 10/131527 | |
| DATED | : January 30, 2007 | |
| INVENTOR(S) | : Just | |

It is certified that error appears in the above-identified patent and that said Letters Patent is hereby corrected as shown below:

Title page, item [73]:
  The Assignee, "Telefonaktie Bolaget LM Ericsson (publ)", should be
-- Telefonaktiebolaget LM Ericsson (publ) --.

Signed and Sealed this

Twenty-second Day of May, 2007

JON W. DUDAS
*Director of the United States Patent and Trademark Office*